(12) United States Patent
Daudel et al.

(10) Patent No.: US 6,216,459 B1
(45) Date of Patent: Apr. 17, 2001

(54) EXHAUST GAS RE-CIRCULATION ARRANGEMENT

(75) Inventors: Helmut Daudel, Schorndorf; Helmut Finger, Leinfelden-Echterdingen; Erwin Schmidt, Baltmannsweiler; Siegfried Sumser, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/459,243

(22) Filed: Dec. 10, 1999

(30) Foreign Application Priority Data

Dec. 11, 1998 (DE) .............................................. 198 57 234

(51) Int. Cl.$^7$ ................................................. F02M 25/07
(52) U.S. Cl. ............................................ 60/605.2; 60/602
(58) Field of Search .................................. 60/602, 605.2; 415/158

(56) References Cited

U.S. PATENT DOCUMENTS

| | | | | |
|---|---|---|---|---|
| 4,179,892 | * | 12/1979 | Heydrich | 60/605.2 |
| 5,611,202 | * | 3/1997 | Sumser et al. | 60/605.2 |
| 5,791,146 | * | 8/1998 | Dungner | 60/605.2 |
| 5,794,445 | * | 8/1998 | Dungner | 60/605.2 |
| 5,855,117 | * | 1/1999 | Sumser et al. | 60/602 |
| 5,943,864 | * | 8/1999 | Sumser et al. | 60/605.2 |

FOREIGN PATENT DOCUMENTS

| | | |
|---|---|---|
| 28 55 687 | 6/1979 | (DE) . |
| 43 03 521 | 1/1994 | (DE) . |
| 43 30 487 | 1/1995 | (DE) . |
| 43 12 078 | 6/1995 | (DE) . |
| 44 29 232 | 9/1995 | (DE) . |
| 196 03 591 | 3/1997 | (DE) . |

* cited by examiner

Primary Examiner—Michael Koczo
(74) Attorney, Agent, or Firm—Klaus J. Bach

(57) ABSTRACT

In an exhaust gas re-circulation arrangement for a supercharged internal combustion engine including an exhaust gas turbocharger with an exhaust gas turbine and a compressor, first and second exhaust pipes extending from the engine separately to the exhaust gas turbine, a charge air duct extending from the compressor to the engine and an exhaust gas recirculation line extending from one of the exhaust pipes upstream of the exhaust gas turbine to the charge air duct downstream of the compressor, the exhaust gas turbine has two turbine inlet flow passages, which provide for different flow volumes and to each of which one of the exhaust pipes is connected and a control arrangement is provided for controlling the exhaust gas flow through the turbine inlet flow passages so as to control the pressure in the exhaust gas re-circulation line to be higher than in the charge air intake duct.

13 Claims, 1 Drawing Sheet

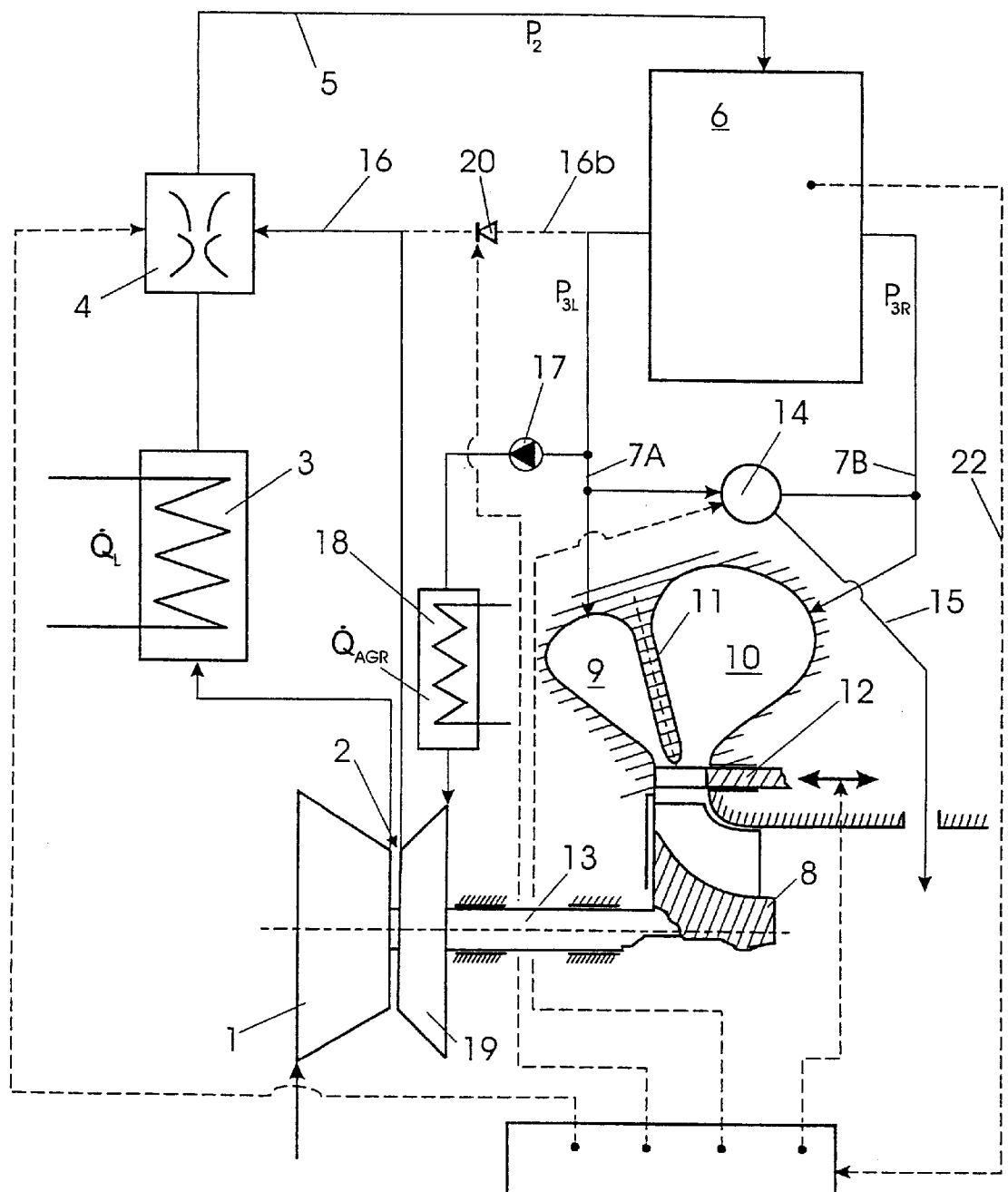
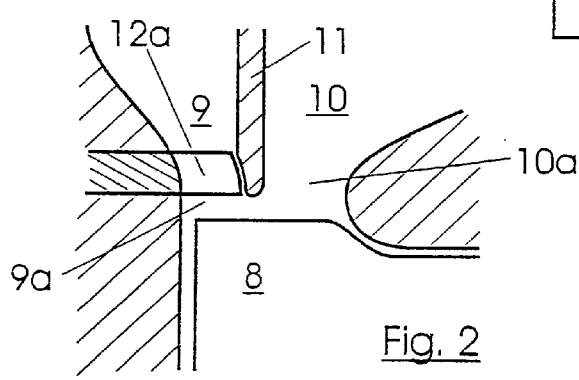
Fig. 1
Fig. 2

EXHAUST GAS RE-CIRCULATION ARRANGEMENT

BACKGROUND OF THE INVENTION

The invention resides in an arrangement for the recirculation of exhaust gases in an internal combustion engine.

In order to achieve the lowest possible emission limits, particularly in connection with internal combustion engines for commercial vehicles, exhaust gas re-circulation concepts are being developed by which the NOx emissions are reduced without essential increases in the fuel consumption. It is known for example, from DE 43 30 487 C1 and DE 43 03 521 C1 to provide a turbocharger, for this purpose with an exhaust gas turbine which includes a variable geometry such as an adjustable flow guide structure, rotatable guide vanes, axially movable flow guide rings or similar devices. By changing the geometry of the exhaust gas turbine, for example, by closing the turbine flow guide structure, a turbine inlet pressures $p_3$ which is larger than the charge air pressure $P_2$ can be obtained over a large operating range up to full engine power. As a result, the exhaust gas can be re-circulated from a point of the exhaust pipe upstream of the turbine to the charge air duct downstream of a charge air cooler (inter-cooler) ahead of the engine without reducing the air/fuel ratio which would affect the fuel consumption.

There are however problems since during full load operation the cylinder pressure limit and also a compression pressure limit of the exhaust gas turbocharger must be observed, whereby exhaust gas re-circulation may be prevented or is at least limited. These limits can be overcome in known arrangements only by additional measures, which affect the overall efficiency of the gas exchange. Additional measures are disclosed, for example, in DE 4 429 232 C1, wherein variable ejectors serving as flow control apparatus, which are arranged in the charge air duct, are disclosed. Also, supplemental compressors for the compression of exhaust gas are known for example from DE 43 12 078 C2.

Using adjustable guide vanes, it is possible to form, during engine braking operation, a so-called turbo-brake wherein the turbine guide vanes structure is adjusted to a very small flow cross-section. As a result, the internal combustion engine is highly charged whereby a very high engine braking power can be obtained.

However, actual tests have shown that the long life expected from engines, and in particular from commercial internal combustion engines, cannot be achieved with the measures known so far.

DE OS 28 55 687 discloses an asymmetrical two-flow exhaust gas turbine, wherein the two spiral inlet flow passages, which are separated by a separating wall, are different in size. With the asymmetrical separation, it is said that the pressure ahead of the smaller inlet flow passage is higher than in the charge air duct so that exhaust gas re-circulation is made possible. In order to insure sufficient exhaust gas re-circulation also with high charge air pressures a large difference in flow cross-section between the two flow passages must be provided which detrimentally affects the turbine efficiency, and generally the charge air exchange efficiency of the engine.

It is the object of the present invention to provide an exhaust gas re-circulation arrangement for a supercharged internal combustion engine, which permits exhaust gas recirculation for the various operating states of the engine without expensive supplemental measures.

SUMMARY OF THE INVENTION

In an exhaust gas re-circulation arrangement for a supercharged internal combustion engine including an exhaust gas turbocharger with an exhaust gas turbine and a compressor, first and second exhaust pipes extending from the engine separately to the exhaust gas turbine, a charge air duct extending from the compressor to the engine and an exhaust gas recirculation line extending from one of the exhaust pipes upstream of the exhaust gas turbine to the charge air duct downstream of the compressor, the exhaust gas turbine has two turbine inlet flow passages, which provide for different flow volumes and to each of which one of the exhaust pipes is connected and a control arrangement is provided for controlling the exhaust gas flow through the turbine inlet flow passages so as to control the pressure in the exhaust gas re-circulation line to be higher than in the charge air intake duct.

With the different inlet flow passages in combination with a variable geometry of the exhaust gas turbine, for example, a variable guide vane arrangement, the pressure of the recirculated gas can be controlled by a control unit in such a way that, when necessary, it is higher than the pressure of the charge air. As a result, exhaust gas re-circulation can always be accomplished. At the same time, it can be prevented by a particular control scheme, that problems arise during full load operation.

In addition to being used as a turbo-brake, the variable geometry may be formed for example by a vane ring structure, which is slideable into one or both of the flow channels. It can be used to control the pressure in the exhaust pipe recirculation line upstream of the exhaust gas turbine and, consequently, also in the exhaust gas re-circulation flow.

If, for example, an as high as possible variability with a relatively high asymmetry of the flow channels is selected, the exhaust pipe, in accordance with a particular embodiment of the invention, may include a pressure release or gas redirecting arrangement by way of which exhaust gas can flow from one to the other of the turbine gas inlet passages or it can be blown off.

In this way, the turbo braking power can be limited and/or the exhaust gas re-circulation volume and the exhaust gas pressure can be controlled.

Since the turbine efficiency drops with increasing asymmetry also the asymmetry may be limited and a pressure control device may be provided in the charge air duct, for example in the form of a variable ejector. It is also possible to provide a supplemental compressor or a second exhaust gas turbocharger, which is arranged in parallel with the first turbocharger.

Instead of, or in addition to, differently sized turbine inlet passages, the inlet passages may have the same size, but a restriction may be arranged in the exit area of one of the passages. Such restriction may be provided for example by an adjustable guide vane structure, which causes a desired pressure build-up in one of the passages.

Below, two embodiments of the invention will be described in greater detail on the basis of the accompanying drawings.

BRIEF DESCRIPTION OF THE DRAWINGS

FIG. 1 is a schematic representation of the invention using two asymmetrical turbine inlet passages, and FIG. 2 is an enlarged view of the exit area of one of the annular turbine inlet passages including an adjustable guide vane structure as a flow restriction.

DESCRIPTION OF PREFERRED EMBODIMENTS

As shown in the schematic representation of FIG. 1, fresh air is compressed in a compressor 1 of an exhaust gas turbocharger 2. After passing through a charge air cooler 3 and a flow control device 4, which may be a variable ejector of a known design, the compressed fresh air is supplied to an internal combustion engine 6 by way of a charge air duct 5. The internal combustion engine 6 includes two separate exhaust manifolds, one for each of two sets of cylinders of the internal combustion engine (for example, the left and the right side) From the exhaust manifolds the exhaust gas is conducted through exhaust gas pipes 7A and 7B to an exhaust gas turbine 8. The exhaust gas turbine 8 includes two spiral inlet flow passages 9 and 10, which are separated from each other by an intermediate wall 11. In the embodiment according to FIG. 1, the annular inlet flow passage 9 is noticeably smaller than the annular inlet flow passage 10. At the jointure of the two inlet passages, there is provided, in a known manner, an adjustable guide vane structure 12, which controls the exhaust gas flow to the turbine 8. The turbine 8 is connected to the compressor 1 by a drive shaft 13. Between the two exhaust gas pipes 7A and 7B, there is a flow control arrangement 14 by way of which an exchange of gas flow between the two exhaust pipes 9 and 10 can be established. Also, the control arrangement 14 permits exhaust gas to be discharged to an area downstream of the turbine 8 by way of a blow-off line 15. In this way, a power and pressure limit for the motor-brake can be provided, which is achieved by the variable geometry of the turbine in accordance with the position of the guide vane structure 12. The flow control arrangement 14 can also be used to influence the exhaust gas volume, which is returned to the charge air intake duct 5 by way of the exhaust gas re-circulation line 16 as well as the air/fuel ratio.

After being branched off the exhaust pipe 7A or 7B, the exhaust gas is conducted first, by way of an exhaust gas recirculation valve 17, to an exhaust gas cooler 18 and then to a supplemental compressor 19, before it is admitted to the charge air duct 5. If a supplemental compressor 19 is used the flow control device 4 can be omitted. The flow control device 4 is mainly provided for the case in which, instead of being recirculated by way of a supplemental compressor 19, the exhaust gas is re-circulated through the valve 20 directly by way of a branch off line 16b (shown in dashed lines) to the exhaust gas re-circulation line 16.

In order to achieve exhaust gas re-circulation, it is only necessary that the exhaust gas pressure P3l in the exhaust pipe 7A or, respectively, the pressure P3r in the exhaust pipe 7B is higher than the charge air pressure P2 ahead of the internal combustion engine 6. If the exhaust gas is re-circulated by way of a supplemental compressor, the pressures P3l and P3r may be lower since the supplemental compressor provides subsequently for a higher pressure as desired. A control unit 21 is provided, which receives control values by way of a control line 22 according to a desired engine performance graph. The control unit 21 supplies the respective control signals for opening and closing the valve 17, or respectively, 20 (selectively) to the flow control device 4 and the positioner for the flow guide structure 12. In the flow control device 4, that is, the ejector, the static pressure of the exhaust gas is reduced when necessary.

The two valves 17 and 20, which are used alternatively may be so-called flutter valves so that the pressure pulsations in the exhaust gas system can be utilized for the exhaust gas recirculation.

Instead of a supplemental compressor 19, a complete additional exhaust gas turbocharger may be provided if necessary (not shown) which is arranged in parallel with the exhaust gas turbocharger 2.

FIG. 2 is a sectional enlargement of a flow restriction by an adjustable guide vane structure 12a for one of the two annular turbine inlet flow passages, that is for the annular flow passage 9. Upon activation of the guide vane structure 12a, that is, when the guide vane structure 12a is inserted into the flow passage 9, the pressure in the annular flow passage is build up as desired.

The arrangement as shown in FIG. 2 may be provided in addition to differently sized annular inlet passages as shown in FIG. 1. Also, the larger inlet flow passage 10 may be provided with a flow guide vane structure 12, whereby a highly variable setup, which is advantageous particularly for use as turbo brake arrangement is obtained.

What is claimed is:

1. An exhaust gas re-circulation arrangement in a supercharged internal combustion engine comprising: an exhaust gas turbocharger with an exhaust gas turbine and a compressor, first and second exhaust pipes extending from said engine separately to said exhaust gas turbine, a charge air duct extending from said compressor to said engine, an exhaust gas recirculation line extending from one of said exhaust pipes upstream of said exhaust gas turbine to said charge air duct downstream of said compressor, said exhaust gas turbine having two inlet flow passages, one connected to said first and the other to said second exhaust pipe and including means for causing different exhaust gas flow volumes to pass through said inlet flow passages, said turbine further having a variable geometry for changing the relative flow volumes to pass through said inlet flow passages, and a control arrangement for controlling the exhaust gas flows to provide a pressure in said exhaust gas re-circulation line, which is higher than the pressure of the charge air in said charge air duct downstream of said compressor.

2. An exhaust gas re-circulation arrangement according to claim 1, wherein, in order to provide for different exhaust gas flow volumes to pass through the two inlet flow passages, said inlet flow passages are asymmetrical, one having a smaller flow cross-section than the other.

3. An exhaust gas re-circulation arrangement according to claim 1, wherein, in order to provide for different exhaust gas flow volumes to pass through the two inlet flow passages, at least one of said inlet flow passages includes at least one flow restriction.

4. An exhaust gas re-circulation arrangement according to claim 1, wherein at least one of said inlet flow passages includes a variable guide vane structure for achieving said variable geometry of said exhaust gas turbine.

5. An exhaust gas re-circulation arrangement according to claim 3, wherein said flow restriction comprises a variable guide vane structure.

6. An exhaust gas re-circulation arrangement according to claim 1, wherein a flow control device is connected to said exhaust pipe for selectively supplying exhaust gas from the exhaust pipe leading to one of said turbine inlet flow passages to the exhaust pipe leading to the other inlet flow passage or to the turbine exhaust.

7. An exhaust gas re-circulation arrangement according to claim 1, wherein said charge air duct includes a flow control device, which is connected to the one exhaust pipe.

8. An exhaust gas re-circulation arrangement according to claim 7, wherein said flow control device is a variable ejector.

9. An exhaust gas re-circulation arrangement according to claim 1, wherein said adjustable guide vane structure comprises an axial slide member.

10. An exhaust gas re-circulation arrangement according to claim 1, wherein said exhaust gas turbocharger includes a supplemental compressor for compressing exhaust gas for recirculation to said charge air intake duct.

11. An exhaust gas re-circulation arrangement according to claim 10, wherein said exhaust gas turbocharger includes a shaft on which all turbine, said compressor and said supplemental compressor are disposed.

12. An exhaust gas re-circulation arrangement according to claim 1, wherein said arrangement includes two of said turbochargers arranged in parallel.

13. An exhaust gas re-circulation arrangement according to claim 1, wherein said exhaust gas re-circulation line includes a flutter valve.

* * * * *